United States Patent
Kiss et al.

(10) Patent No.: US 11,616,709 B2
(45) Date of Patent: Mar. 28, 2023

(54) METHOD AND SYSTEM FOR PREDICTING AVAILABILITY IN A RADIO FREQUENCY LINK AGGREGATION GROUP

(71) Applicant: CommScope Technologies LLC, Hickory, NC (US)

(72) Inventors: Henrik K. Kiss, Kecskemét (HU); Brian J. Eichenser, Leesburg, VA (US); Joseph N. Marzin, Potomac Falls, VA (US)

(73) Assignee: CommScope Technologies LLC, Hickory, NC (US)

( * ) Notice: Subject to any disclaimer, the term of this patent is extended or adjusted under 35 U.S.C. 154(b) by 124 days.

(21) Appl. No.: 16/649,276

(22) PCT Filed: Sep. 20, 2018

(86) PCT No.: PCT/US2018/051886
§ 371 (c)(1),
(2) Date: Mar. 20, 2020

(87) PCT Pub. No.: WO2019/070410
PCT Pub. Date: Apr. 11, 2019

(65) Prior Publication Data
US 2020/0287815 A1     Sep. 10, 2020

Related U.S. Application Data

(60) Provisional application No. 62/567,815, filed on Oct. 4, 2017.

(51) Int. Cl.
*H04L 12/26*    (2006.01)
*H04L 12/709*    (2013.01)
(Continued)

(52) U.S. Cl.
CPC ........ *H04L 43/0882* (2013.01); *H04L 45/245* (2013.01); *H04W 24/08* (2013.01); *H04W 24/10* (2013.01)

(58) Field of Classification Search
CPC ... H04L 43/0882; H04L 45/245; H04W 24/08
(Continued)

(56) References Cited

U.S. PATENT DOCUMENTS

2007/0041328 A1\*   2/2007   Bell ........................ H04L 12/46
                                                                     370/348
2008/0267184 A1   10/2008   Arisoylu et al.
(Continued)

FOREIGN PATENT DOCUMENTS

WO      2008093309 A2     8/2008

OTHER PUBLICATIONS

International Searching Authority, "International Search Report and Written Opinion from PCT Application No. PCT/US2018/051886", dated Jan. 25, 2019, pp. 1-10, Published: WO.
(Continued)

*Primary Examiner* — Faisal Choudhury
(74) *Attorney, Agent, or Firm* — Fogg & Powers LLC (57) ABSTRACT

A method is provided. The method comprises receiving link information for each link of aggregated links, where the received link information comprises data for each link including at least one capacity, and corresponding availability due to one or more link availability factors; and generating availability data for each capacity of the aggregated links.

25 Claims, 7 Drawing Sheets

(51) Int. Cl.
*H04L 43/0882* (2022.01)
*H04L 45/24* (2022.01)
*H04W 24/08* (2009.01)
*H04W 24/10* (2009.01)

(58) Field of Classification Search
USPC .......................................................... 370/252
See application file for complete search history.

(56) References Cited

U.S. PATENT DOCUMENTS

| | | |
|---|---|---|
| 2008/0304519 A1 | 12/2008 | Koenen et al. |
| 2010/0118718 A1* | 5/2010 | Kobayashi .............. H04L 47/10 |
| | | 370/252 |
| 2010/0149988 A1* | 6/2010 | Matsubara .............. H04L 45/38 |
| | | 370/237 |
| 2011/0302027 A1* | 12/2011 | Dibirdi ................. H04L 47/125 |
| | | 370/235 |
| 2012/0008596 A1* | 1/2012 | Jung .................. H04W 36/0033 |
| | | 370/331 |
| 2013/0237263 A1 | 9/2013 | Vuyyuru |
| 2015/0282005 A1* | 10/2015 | Du ........................ H04L 45/245 |
| | | 370/394 |
| 2015/0312961 A1* | 10/2015 | Sun ................... H04W 52/0258 |
| | | 370/330 |
| 2016/0202847 A1* | 7/2016 | Wong .................... H04M 15/28 |
| | | 455/407 |
| 2016/0219459 A1* | 7/2016 | Buddhikot ........ H04W 28/0958 |
| 2017/0055268 A1 | 2/2017 | Aksu |
| 2019/0068473 A1* | 2/2019 | Vu ...................... H04L 43/0882 |

OTHER PUBLICATIONS

International Bureau, "International Preliminary Report on Patentability from PCT Application No. PCT/US2018/051886", from Foreign Counterpart to U.S. Appl. No. 16/649,276, dated Apr. 16, 2020, pp. 1 through 7, Published: WO.

* cited by examiner

| LINK1 | | | | LINK2 | | | | TOTAL | | | | |
|---|---|---|---|---|---|---|---|---|---|---|---|---|
| Capacity | Rain (s) | MP (s) | HW(s) | Capacity | Rain (s) | MP (s) | HW(s) | Capacity | Rain (s) | MP (s) | HW(s) | Down-time |
| 1000 | 400 | 150 | 50 | 500 | 100 | 450 | 25 | 1500 | 400 | 600 | 75 | 1075 |
| 400 | 200 | 100 | 50 | 0 | 0 | 0 | 0 | 900 | 200 | 550 | 75 | 825 |
| 0 | 0 | 0 | 0 | | | | | 500 | 100 | 450 | 25 | 575 |
| 1000 | 400 | 150 | 50 | | | | | 1000 | 400 | 150 | 50 | 600 |
| 400 | 200 | 100 | 50 | | | | | 400 | 200 | 100 | 50 | 350 |
| 0 | 0 | 0 | 0 | | | | | 0 | 0 | 0 | 0 | 0 |

| | TOTAL | | | | Down-time |
|---|---|---|---|---|---|
| Capacity | Rain (s) | MP (s) | HW(s) | | |
| 1500 | 400 | 600 | 75 | | 1075 |
| 1000 | 400 | 150 | 50 | | 600 |
| ~~900~~ | ~~200~~ | ~~550~~ | ~~75~~ | | ~~825~~ |
| 500 | 100 | 450 | 25 | | 575 |
| 400 | 200 | 100 | 50 | | 350 |
| 0 | 0 | 0 | 0 | | 0 |

| Capacity | TOTAL | | | Down-time |
|---|---|---|---|---|
| | Rain (s) | MP (s) | HW(s) | |
| 1500 | 400 | 600 | 75 | 1075 |
| 1000 | 400 | 150 | 50 | 600 |
| 500 | 100 | 450 | 25 | 575 |
| 400 | 200 | 100 | 50 | 350 |
| 0 | 0 | 0 | 0 | 0 |

METHOD AND SYSTEM FOR PREDICTING AVAILABILITY IN A RADIO FREQUENCY LINK AGGREGATION GROUP

CROSS-REFERENCE TO RELATED APPLICATIONS

The present application is a U.S. National Stage of PCT Application No. PCT/US2018/051886, filed Sep. 20, 2018, which claims benefit of U.S. Patent Application Ser. No. 62/567,815, filed Oct. 4, 2017; the entire contents of both of the aforementioned patent applications are incorporated herein by reference in their entirety.

BACKGROUND

Deployment of optical fiber communications systems have become more prevalent during recent decades. However, the cost and time to deploy optical fiber communications systems is greater than for fixed radio frequency (RF), e.g. microwave and millimeter wave, communications systems. Further, fixed RF communications systems have lower latency then optical fiber communications systems which is desirable in some applications. Fixed RF communications systems permit transmission between two fixed points having radio systems that communicate in the microwave and/or millimeter wave bands.

The amount of data being transmitted by fixed RF communications systems, or links, is ever increasing. To reliably provide higher data capacities, the data communication capacities of at least two links (e.g. two links each operating in a different RF band, e.g. in different microwave and/or millimeter wave bands) are aggregated. Communications system planners have a need to estimate availability, or correspondingly downtime or uptime, of such aggregated links.

SUMMARY OF THE INVENTION

A method is provided. The method comprises receiving link information for each link of aggregated links, where the received link information comprises data for each link including at least one capacity, and corresponding availability due to one or more link availability factors; and generating availability data for each capacity of the aggregated links.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 3 illustrates one embodiment of an exemplary table of link capacities and corresponding downtime data for each specified link availability factor;

DETAILED DESCRIPTION

The embodiments of an invention are improvement to techniques for estimating link availability factors for two or more aggregated links. The embodiments facilitate more efficient and reliable determination of link availability factors.

Figure 1A:
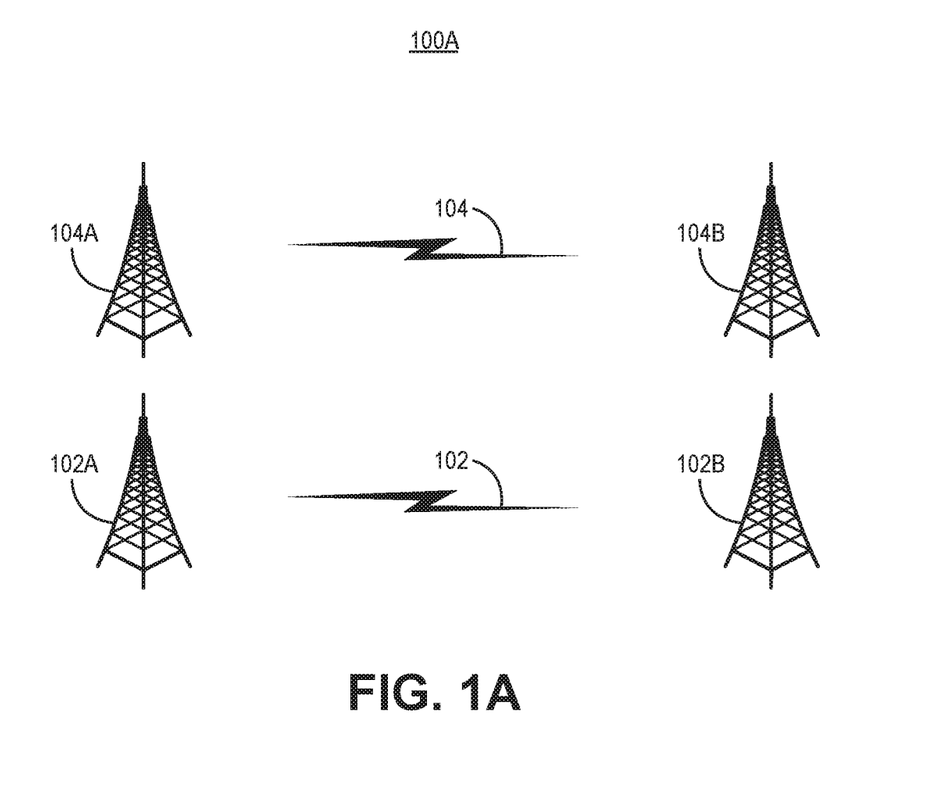
FIG. 1A illustrates one embodiment of two aggregated links.

FIG. 1A illustrates one embodiment of two aggregated links 100A. The term link means a network formed by at least two radio systems at fixed locations and which provide backhaul communications as part of a larger network. Aggregated links can include two or more links. Aggregated links may also be referred herein as link aggregation groups. Further, for pedagogical reasons, two aggregated links will be exemplified herein.

The illustrated two aggregated links 100A comprise a first link 102 and a second link 104. The first link 102 comprises of a first radio system 102A and a second radio system 102B. The second link 104 comprises of a third radio system 104A and a fourth radio system 104B. The first radio system 102A and the third radio system 104A are typically co-located, e.g. at and/or on the same tower; however, in another embodiment, they may be positioned at different locations. Similarly, the second radio system 102B and the fourth radio system 104B are typically co-located, e.g. at and/or on the same tower; however, in another embodiment, they may be positioned at different locations. In one embodiment, the first link 102 and the second link 104 may both operate in different microwave bands, such as X and Ku bands, or in different millimeter wave bands, such as Ka and V bands. In an alternative embodiment, the first link 102 and the second link 104 may operate respectively in a microwave band and a millimeter wave band, such as respectively Ku band and V band.

Each link may have one or more capacities. Capacity as used herein, means data rates, e.g. corresponding to one or more modulation types. Lower capacities may be used to maintain communications in the event of interference, e.g. due to other radio signals or noise, and/or one of the link availability factors described below. Link availability factors are factors that affect link availability, i.e. whether the link communications are unavailable. Link availability factors include multipath, attenuation by rain, and equipment failures. In one embodiment, the effect of interference is accounted for in the multipath and attenuation by rain link availability factors, because such interference will cause link unavailability thresholds for those factors to be reduced.

Figure 1B:
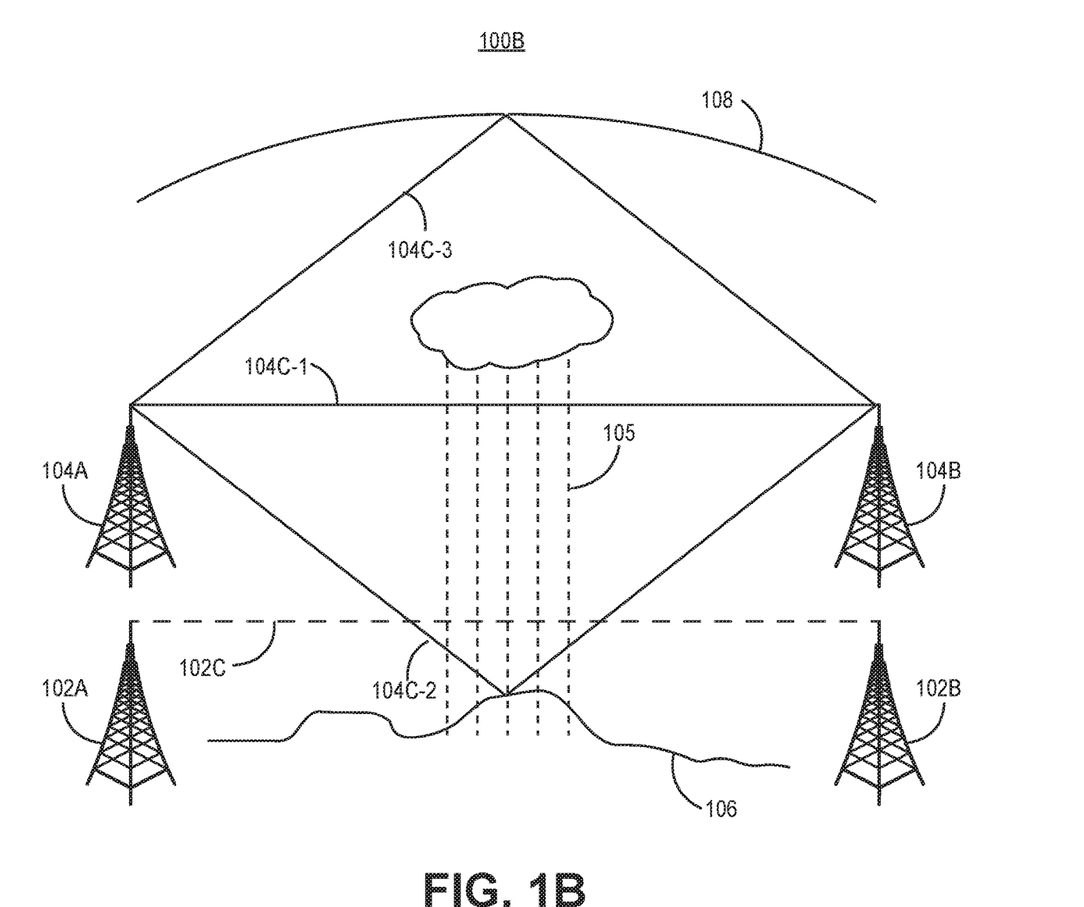
FIG. 1B illustrates one embodiment of two aggregated links and environmental conditions which can affect the performance of the aggregated links.

FIG. 1B illustrates one embodiment of two aggregated links and environmental conditions which can affect the performance of the aggregated links 100B. Firstly, at least one of the links forming the aggregated links 100B is susceptible to multipath where link radio signal travel by two or more paths. Three exemplary multipaths are illustrated in FIG. 1B for the second link 104: a direct, or line of sight path 104C-1, a ground reflection path 104C-2, an atmospheric refraction path 104C-3. The ground reflection path 104C-2 is arises from radio signals reflected from terrain 106. The atmospheric refraction path 104C-3 arises from refraction of a radio signal by the atmosphere 108, e.g. the troposphere. FIG. 1B illustrated rain 105 in the line of sight path 104C-1 and the ground reflection path 104C-2.

The illustrated rain 105 can attenuate the radio signals propagating along those two paths.

Multipath can cause constructive and destructive interference, and phase shifting of a signal broadcast over a link. The communications system planners desire to know availability due to of destructive interference and phase shifting, also known as multipath fading. Models such as International Telecommunication Union's (ITU's) ITU-R P.530 model or the Barnett-Vigants model can be used to model link availability due to multipath fading.

As used herein, availability shall mean uptime or downtime. Whereas downtime is an amount of time in a period that that a system is unavailable due to one or more conditions, uptime is an amount of time in a period that that a system is available upon the occurrence of one or more conditions. The sum of uptime and downtime equal the time period.

Availability is described in a time period with respect to another time period, e.g. 100 seconds per year. For pedagogical reasons, availability will be described in terms of seconds per year. However, availability can be described in alternate units.

Typically, the effects of multipath are uncorrelated amongst links comprising aggregated links. However, under some circumstances, the effects of multipath—amongst two or more links comprising aggregated links—may be partially correlated. For example, if each link of an aggregated link encounters common atmospheric conditions, multipath in the different links of aggregated links may be partially correlated. For example, if the distance, between two radios forming a millimeter-wave link, is extended beyond its normal operating range (decreasing its fade margin), and each of the two radios are each collocated with a microwave link radio, then there may be partial correlation of multipath between the millimeter wave link and the microwave link.

In one embodiment, a partial correlation factor may be determined by statistically analyzing meteorological data in the region of the aggregated links, and/or past measured data for propagation between each of the aggregated links. In another embodiment, the partial correlation factor may also be dependent upon a difference in operating frequencies of the links. The partial correlation factor is generated by statistical analytical techniques known to one skilled in the art.

An improvement factor can be generated from the partial correlation factor and from fade margins of the links of the aggregated links. The improvement factor can be determined by generating a relationship by measuring availability over aggregated links, and generating an empirical relationship based upon corresponding determined partial correlation factors and measured fade margin data.

Partially correlated availability due to multipath lies between (a) a largest downtime (or a smallest uptime), due to multipath, of any capacity of a combination of capacities, and (b) a sum of the downtimes (or uptimes), due to multipath of all capacities of a combination of capacities. The partially correlated availability is determined by dividing a largest downtime by an improvement factor greater than one, or multiplying the smallest uptime by the improvement factor greater than one. Manipulation of data for each data capacity combination for each set of links will be subsequently described.

Link availability can also be affected by attenuation by rain, and equipment failures. The communications system planners also desire to know link availability arising from the attenuation by rain. Rain is illustrated in FIG. 1B. Models such as the ITU-R P.838 model or a Crane model can be used to model link availability due to attenuation by rain. Link availability due to attenuation due to rain is deemed to be correlated because rain occurs at the same time and location for each link of aggregated links.

The communications system planners further desire to know link availability arising from the equipment failures in a link. Models may be created, for the radio systems used to implement a link, to model link availability. Alternatively, such data may be obtained from equipment manufacturers or generated using historical reliability data for such radio systems. Link availability due to equipment failures is deemed to be uncorrelated because it is unlikely that radio systems would fail at the same time.

However, as with multipath, a partial correlation factor can be determined for link availability arising from equipment failure based upon correlated equipment failure due to (a) common environmental factors, e.g. such as common power surges or power loss, and (b) common equipment manufacturer, e.g. resulting in the same mean time to failures. The partial correlation factor can be determined from reliability model(s) for the power distribution system providing power to the radio systems in the links, and reliability models for the radio system(s). The partial correlation factor can be derived, additionally with or solely from, historical data about the reliability of such power distribution systems and radio systems.

Partially correlated availability due to equipment failure lies between (a) a largest downtime (or a smallest uptime), due to equipment failure, of any capacity of a combination of capacities, and (b) a sum of the downtimes (or uptimes), due to equipment failure, of all capacities of a combination of capacities. The partial correlation factor may be an improvement factor (greater than one). The largest downtime is divided by the partial correlation factor, or the smallest uptime is multiplied by the partial correlation factor to determine partial correlated availability due to equipment failure. Manipulation of data for each data capacity combination for each set of links will be subsequently described.

Figure 2:
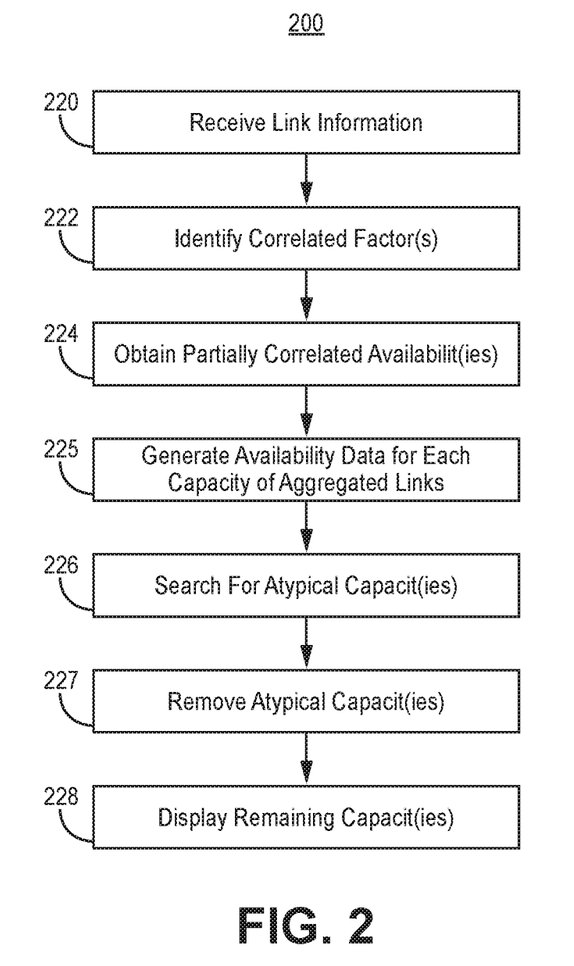
FIG. 2 illustrates one embodiment of a method of predicting availability in a radio frequency link aggregation group.

Prior to installation of aggregated links, it is desirable to evaluate whether different data rates of the aggregated links have satisfactory availability. FIG. 2 illustrates one embodiment of a method of predicting availability in a radio frequency link aggregation group (method) 200. To the extent the method 200 shown in FIG. 2 is described herein as being implemented in the system shown in FIG. 6, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 220, receive link information for aggregated links. In one embodiment, received link information is data for each link including data capacities, and for each capacity corresponding availability due to one or more link availability factors, e.g. attenuation by rain, multipath, and/or equipment failures. In another embodiment, assign each link a zero data rate capacity and zero downtime (or one hundred percent uptime) for each corresponding link availability factor.

Optionally, in one embodiment, in block 222, determining whether at least one link availability factor has a partially correlated availability. Correlated availability factors are completely correlated factors and/or partially correlated factors. Any factors that are not completely or partially correlated, are uncorrelated factors. Alternatively, in another embodiment, correlated (and uncorrelated factors) may have already been identified; in a further embodiment, such already identified, and are stored in and accessed from software and/or hardware, e.g. in memory.

Optionally, in one embodiment, in block 224 for each link availability factor determined to have a partial correlated availability, obtain the partially correlated availability, e.g. as described above. In another embodiment, the partially correlated availability is determined in real time, or, if previously determined, is stored in and accessed from software and/or hardware, e.g. in memory.

In block 225, generate availability data for each capacity of aggregated links. In another embodiment, this includes generating a total availability data for each link availability factor, and summing the total availability data of each link availability factor for each capability. In a further embodiment, sort the capacities, e.g. in ascending or descending order.

In block 226, search for at least one atypical capacity. An atypical capacity means a capacity that has a higher total estimated downtime, or lower total estimated uptime, then any higher capacity. In block 227, remove any atypical capacit(ies) (uncovered by the search) and corresponding availability data. An atypical capacity can be removed if there is a higher capacity, with a lower total estimated downtime or higher estimated total uptime, because that higher capacity will satisfy the requirements of the atypical capacity but a lower total estimated downtime or a higher estimated total uptime. Thus, the removal generates capacity and corresponding availability data with best case conditions, which is more readily comprehensible for a communications system planner, by disposing of the at least one atypical capacity having worst case conditions.

In block 228, display remaining capacities and corresponding availability data. Remaining capacities means capacities less any atypical capacit(ies) which have been removed. The corresponding availability data comprises the total availability data for each link availability factor, and/or the sum of the total availability data of each link availability factor for each capability.

An exemplary tabular implementation of the method 200 will now be described. FIG. 3 illustrates one embodiment of an exemplary table of link capacities and corresponding downtime data for each specified link availability factor (link analysis table) 300. The link analysis table 300 is exemplified for aggregated links having a first link (LINK1) having two data rates, and a second link (LINK2) having one data rate.

Link analysis tables may also be created for aggregated links having three or more links, and/or for links having three or more data rates. For pedagogical reasons, the illustrated link availability factor data is in seconds per year, and the link availability data is illustrated as downtime. The illustrated link analysis table 300 includes a first link sub-table 333A, a second link sub-table 333B, and a total capacities sub-table 335.

The first links sub-table 333A includes a column 330A of each capacity for the first link (and a zero capacity) for each capacity of the second link (and a zero capacity). As illustrated in FIG. 3, the first link has two capacities: 1000 Mbit/s and 400 Mbit/s; the second link has one capacity: 500 Mbit/s. For example, the first link may be a higher data rate millimeter wave link, and the second link may be a lower data rate microwave link. Thus, first link capacities of 1000 Mbit/s, 400 Mbit/s, and 0 Mbit/s, and corresponding downtime data for link availability factors (attenuation due to rain (Rain) 332A, multipath (MP) 334A, and equipment (HW) 336A) are specified for each of second link capacities: 500 Mbit/s and 0 Mbit/s.

The second links sub-table 333B includes a column 330B of each capacity for the second link (and a zero capacity). Thus, second link capacities of 500 Mbit/s and 0 Mbit/s, and corresponding downtime data for link availability factors (attenuation due to rain (Rain) 332B, multipath (MP) 334B, and equipment (HW) 336B) are specified for each of second link capacities: 500 Mbit/s and 0 Mbit/s.

The total capacities sub-table 335 includes a column 330C of each total capacity for an aggregate of the first link and the second link columns, columns of downtime data for link availability factors (attenuation due to rain (Rain) 332C, multipath (MP) 334C, and equipment (HW) 336C) for each total capacity, and a column for total downtime 338 for each total capacity. The total capacities are determined by adding each capacity of the first link to a capacity of the second link. The total downtime for each correlated link availability factor, e.g. attenuation due to rain, is calculated by taking the largest downtime data of the corresponding capacities of the links. The total downtime for each uncorrelated link availability factor is determined by summing the downtime data of the corresponding capacities of the links. The total downtime for each partially correlated link availability data is determined as described above.

Figure 4:
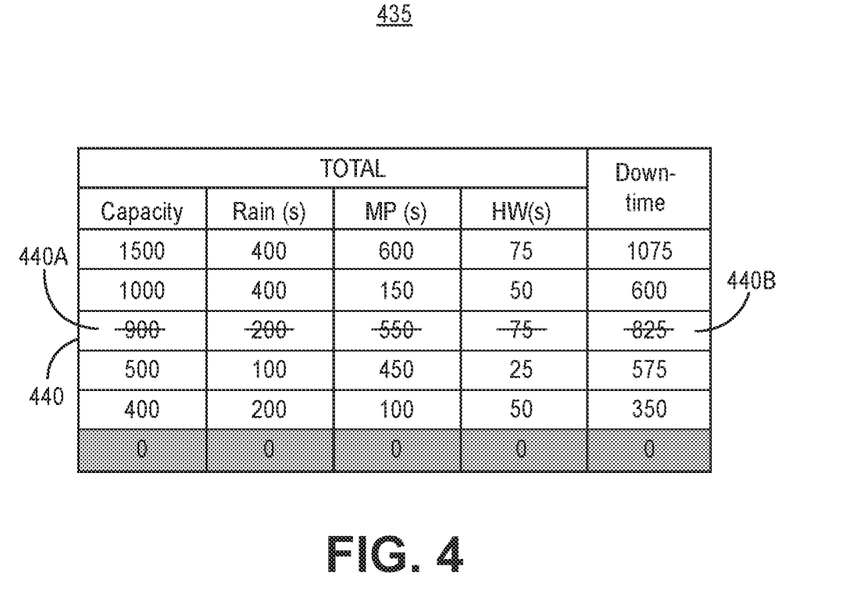
FIG. 4 illustrates an exemplary total capacities table.

FIG. 4 illustrates an exemplary total capacities table 400. In the illustrated total capacities table 400, the rows have been reordered, or sorted, in descending order of Capacity and in ascending order of Downtime (for rows with identical capacities), and a row 440 corresponding to an atypical capacity 440A has been identified. The atypical capacity 440A has a downtime of 825 s/year that is greater than a downtime, 600 s/year of a preceding capacity of 1000 Mbit/s.

Figure 5:
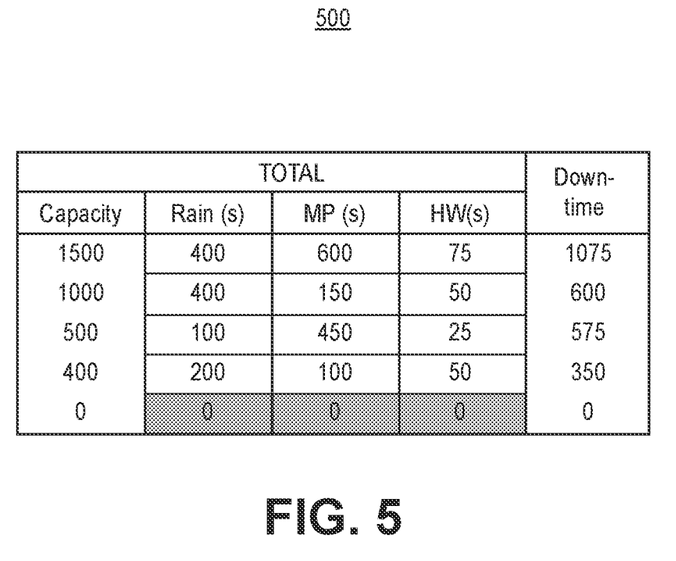
FIG. 5 illustrates an exemplary final total capacities table.

FIG. 5 illustrates an exemplary final total capacities table 500 from which the atypical capacity and corresponding link availability data has been removed. The final total capacities table 500 provides, to a communications system planner, information about aggregated links that the planner can use to design a communication system. Such information includes capacities of aggregated links, link availability factor downtime data for each capacity, and total downtime data for each capacity.

Figure 6:
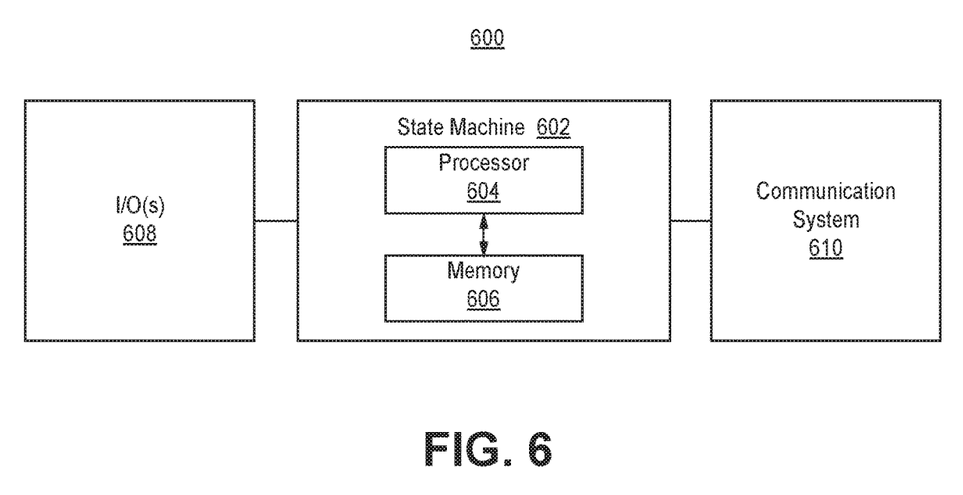
FIG. 6 is a block diagram of an exemplary computer system.

The methods disclosed above may be implemented in one of many systems. FIG. 6 is a block diagram of an exemplary computer system 600 that can implement such methods. The illustrated computer system 600 comprises a state machine 602 which is implemented with at least one processor (processor) coupled to at least one memory (memory) 606. In another embodiment, the state machine 602 is a computer.

In one embodiment, the computer system 600 may include at least one input/output device (I/O(s)) 608 coupled to the state machine 602. In another embodiment, the I/O(s) 608 includes a display (such as a touchscreen display), a cursor control device, and/or a keyboard. The I/O(s) 608 facilitates the inputting of data by a user, and the display of data to the user. In a further embodiment, the I/O(s) 608 can facilitate displaying remaining at least one capacity and corresponding availability data.

In one embodiment, the computer system 600 can also incorporates a communication system 610 coupled to the state machine 602, to enable transmission and reception of data with remote systems, such as other computer systems. In one embodiment, the communication system 610 is a data modem, a radio transceiver (with or without an antenna), and/or any other communications device(s).

The processor 604 can be implemented using software, firmware, hardware, or any appropriate combination thereof, as known to one of skill in the art. By way of example and not limitation, hardware components for processor 604 can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). In this exemplary embodiment, processor 604 includes or functions with software programs, firmware, or other computer readable instructions for carrying out various process tasks, calculations, and control functions, used in the methods described herein. These instructions are typically tangibly embodied on any appropriate medium used for storage of computer readable instructions or data structures.

The memory 606 can be implemented with any available computer readable storage media that can be accessed by a general purpose or special purpose computer or processor, or any programmable logic device. Suitable computer readable media may include storage or memory media such as semiconductor, magnetic, and/or optical media. For example, storage or memory media may include conventional hard disks, Compact Disk—Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Suitable processor-readable media may also include transmission media such as electrical, electromagnetic, or digital signals, conveyed, e.g. through the communication system 710, via a communication medium, such as a network and/or a wireless link. Combinations of the above are also included within the scope of computer readable media.

Methods of the invention can be implemented in computer readable instructions, such as program modules or applications, which are executed by a data processor. Generally, program modules or applications include routines, programs, objects, data components, data structures, algorithms, and the like, which perform particular tasks or implement particular abstract data types. These represent examples of program code means for executing steps of the methods disclosed herein. The particular sequence of such executable instructions or associated data structures represent examples of corresponding acts for implementing the functions described in such steps.

Databases as used herein may be either conventional databases or data storage formats of any type, e.g. data files. Although separate databases are recited herein, one or more of such databases may be combined.

EXAMPLE EMBODIMENTS

Example 1 includes a method, comprising: receiving link information for each link of aggregated links, where the received link information comprises data for each link including at least one capacity, and corresponding availability due to one or more link availability factors; and generating availability data for each capacity of the aggregated links.

Example 2 includes the method of Example 1, wherein the receiving link information comprises receiving link information for aggregated links, where the received link information comprises data for each link including data capacities, and for each capacity corresponding availability due to one or more link availability factors comprising at least one of attenuation due to rain, multipath, and equipment failure.

Example 3 includes the method of any of Examples 1-2, further comprising assigning each link a zero data rate capacity and zero downtime, or one hundred percent uptime, for each corresponding link availability factor.

Example 4 includes the method of any of Examples 1-3, further comprising determining whether at least one link availability factor has a partially correlated availability; and for each link availability factor determined to have the partially correlated availability, obtaining the partially correlated availability.

Example 5 includes the method of any of Examples 1-4, wherein the generating availability data comprises generating a total availability data for each link availability factor, and summing the total availability data of each link availability factor.

Example 6 includes the method of any of Examples 1-5, further comprising sorting rows in descending order of capacity, and in ascending order of downtime for rows with identical capacities.

Example 7 includes the method of any of Examples 1-6, further comprising searching for atypical capacities; and removing any uncovered atypical capacity.

Example 8 includes the method of any of Examples 1-7, further comprising displaying at least one remaining capacity and corresponding availability data.

Example 9 includes a non-transitory computer readable medium storing a program causing a state machine to execute a process, the process comprising: receiving link information for each link of aggregated links, where the received link information comprises data for each link including at least one capacity, and corresponding availability due to one or more link availability factors; and generating availability data for each capacity of the aggregated links.

Example 10 includes the non-transitory computer readable medium of Example 9, wherein the receiving link information comprises receiving link information for aggregated links, where the received link information comprises data for each link including data capacities, and for each capacity corresponding availability due to one or more link availability factors comprising at least one of attenuation due to rain, multipath, and equipment failure.

Example 11 includes the non-transitory computer readable medium of any of Examples 9-10, further comprising assigning each link a zero data rate capacity and zero downtime, or one hundred percent uptime, for each corresponding link availability factor.

Example 12 includes the non-transitory computer readable medium of any of Examples 9-11, further comprising determining whether at least one link availability factor has a partially correlated availability; and for each link availability factor determined to have the partially correlated availability, obtaining the partially correlated availability.

Example 13 includes the non-transitory computer readable medium of any of Examples 9-12, wherein the generating availability data comprises generating a total availability data for each link availability factor, and summing the total availability data of each link availability factor.

Example 14 includes the non-transitory computer readable medium of any of Examples 9-13, further comprising sorting the capacities in one of ascending or descending order.

Example 15 includes the non-transitory computer readable medium of any of Examples 9-14, further comprising identifying at least one atypical capacity; and removing the at least one atypical capacity.

Example 16 includes the non-transitory computer readable medium of any of Examples 9-15, further comprising displaying at least one remaining capacity and corresponding availability data.

Example 17 includes a system, comprising: a state machine, wherein the state machine is configured to: receive link information for each link of aggregated links, where the received link information comprises data for each link including at least one capacity, and corresponding availability due to one or more link availability factors; and generate availability data for each capacity of the aggregated links; and wherein the state machine is configured to be coupled to at least one of (a) at least one input/output device, and (b) a communication system.

Example 18 includes the system of Example 17, wherein the state machine comprises: at least one processor; and at least one memory coupled to the at least one processor.

Example 19 includes the system of any of Examples 17-18, wherein the receive link information comprises receive link information for aggregated links, where the received link information comprises data for each link including data capacities, and for each capacity corresponding availability due to one or more link availability factors comprising at least one of attenuation due to rain, multipath, and equipment failure.

Example 20 includes the system of any of Examples 17-19, further comprising assign each link a zero data rate capacity and zero downtime, or one hundred percent uptime, for each corresponding link availability factor.

Example 21 includes the system of any of Examples 17-20, further comprising determine whether at least one link availability factor has a partially correlated availability; and for each link availability factor determined to have the partially correlated availability, obtain the partially correlated availability.

Example 22 includes the system of any of Examples 17-21, wherein the generate availability data comprises generating a total availability data for each link availability factor, and summing the total availability data of each link availability factor.

Example 23 includes the system of any of Examples 17-22, further comprising sort the capacities in one of ascending or descending order.

Example 24 includes the system of any of Examples 17-23, further comprising identify at least one atypical capacity; and removing the at least one atypical capacity.

Example 25 includes the system of any of Examples 17-24, further comprising display at least one remaining capacity and corresponding availability data on the at least one input/output device.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method, comprising:
receiving link information for each link of aggregated links, wherein the received link information comprises data for a corresponding link including at least one capacity of the corresponding link, and availability of the corresponding link due to one or more link availability factors, wherein a link is a network formed by at least two wireless radio systems at fixed locations and is configured to provide backhaul communications as part of a larger network, wherein the availability means uptime or downtime, wherein the downtime means an amount of time in a time period that the corresponding link is unavailable, wherein the uptime means an amount of time in the time period that the corresponding link is available, and wherein the time period equals a sum of the uptime and the downtime; and
generating a prediction of the availability for each capacity of the aggregated links.

2. The method of claim 1, wherein the one or more link availability factors comprise at least one of attenuation due to rain, multipath, and equipment failure.

3. The method of claim 1, further comprising assigning each link a zero data rate capacity and zero downtime, or one hundred percent uptime, for each corresponding link availability factor.

4. The method of claim 1, further comprising determining whether at least one link availability factor has a partially correlated availability; and
for each link availability factor determined to have the partially correlated availability, obtaining the partially correlated availability.

5. The method of claim 1, wherein generating the predictive availability data comprises generating a total predictive availability data for each link availability factor, and summing the total predictive availability data of each link availability factor.

6. The method of claim 1, further comprising sorting rows in descending order of capacity, and in ascending order of the downtime for rows with identical capacities.

7. The method of claim 1, further comprising:
identifying at least one atypical capacity, wherein an atypical capacity means a capacity that has a higher total estimated downtime, or lower total estimated uptime, then any higher capacity; and
removing the identified at least one atypical capacity.

8. The method of claim 7, further comprising displaying at least one remaining capacity and corresponding predictive availability data.

9. A non-transitory computer readable medium storing a program causing a processor to execute a process, the process comprising:
receiving link information for each link of aggregated links, wherein the received link information comprises data for a corresponding link including at least one capacity of the corresponding link, and availability of the corresponding link due to one or more link availability factors, wherein a link is a network formed by at least two wireless radio systems at fixed locations and is configured to backhaul communications as part of a larger network, wherein the availability means uptime or downtime, wherein the downtime means an amount of time in a time period that the corresponding link is unavailable, wherein the uptime means an amount of time in the time period that the corresponding link is available, and wherein the time period equals a sum of the uptime and the downtime; and
generating a prediction of the availability for each capacity of the aggregated links.

10. The non-transitory computer readable medium of claim 9, wherein the one or more link availability factors comprise at least one of attenuation due to rain, multipath, and equipment failure.

11. The non-transitory computer readable medium of claim 9, wherein the process further comprises assigning each link a zero data rate capacity and zero downtime, or one hundred percent uptime, for each corresponding link availability factor.

12. The non-transitory computer readable medium of claim 9, wherein the process further comprises:
determining whether at least one link availability factor has a partially correlated availability; and
for each link availability factor determined to have the partially correlated availability, obtaining the partially correlated availability.

13. The non-transitory computer readable medium of claim 9, wherein generating the predictive availability data comprises generating a total predictive availability data for each link availability factor, and summing the total predictive availability data of each link availability factor.

14. The non-transitory computer readable medium of claim 9, wherein the process further comprises sorting capacities in one of ascending or descending order.

15. The non-transitory computer readable medium of claim 9, wherein the process further comprises:
identifying at least one atypical capacity, wherein an atypical capacity means a capacity that has a higher total estimated downtime, or lower total estimated uptime, then any higher capacity; and
removing the identified at least one atypical capacity.

16. The non-transitory computer readable medium of claim 9, wherein the process further comprises causing at least one remaining capacity and corresponding predictive availability data to be displayed.

17. A system, comprising:
processor circuitry configured to:
receive link information for each link of aggregated links, wherein the received link information comprises data for a corresponding link including at least one capacity of the corresponding link, and availability of the corresponding link due to one or more link availability factors, wherein a link is a network formed by at least two wireless radio systems at fixed locations and is configured to provide backhaul communications as part of a larger network, wherein the availability means uptime or downtime, wherein the downtime means an amount of time in a time period that the corresponding link is unavailable, wherein the uptime means an amount of time in the time period that the corresponding link is available, and wherein the time period equals a sum of the uptime and the downtime; and
generate a prediction of the availability for each capacity of the aggregated links.

18. The system of claim 17, wherein the processor circuitry comprises:
at least one processor; and
at least one memory coupled to the at least one processor.

19. The system of claim 17, wherein the one or more link availability factors comprise at least one of attenuation due to rain, multipath, and equipment failure.

20. The system of claim 17, wherein the processor circuitry is further configured to assign each link a zero data rate capacity and zero downtime, or one hundred percent uptime, for each corresponding link availability factor.

21. The system of claim 17, wherein the processor circuitry is further configured to:
determine whether at least one link availability factor has a partially correlated availability; and
for each link availability factor determined to have the partially correlated availability, obtain the partially correlated availability.

22. The system of claim 17, wherein generate the predictive availability data comprises generate a total predictive availability data for each link availability factor, and sum the total predictive availability data of each link availability factor.

23. The system of claim 17, wherein the processor circuitry is further configured to sort capacities in one of ascending or descending order.

24. The system of claim 17, wherein the processor circuitry is further configured to:
identify at least one atypical capacity, wherein an atypical capacity means a capacity that has a higher total estimated downtime, or lower total estimated uptime, then any higher capacity; and
remove the identified at least one atypical capacity.

25. The system of claim 24, wherein the processor circuitry is further configured to cause at least one remaining capacity and corresponding predictive availability data to be displayed on at least one input/output device.

\* \* \* \* \*